H. G. SHAUG.
WATER HEATER.
APPLICATION FILED APR. 15, 1916.
1,255,835.
Patented Feb. 5, 1918.
2 SHEETS—SHEET 2.
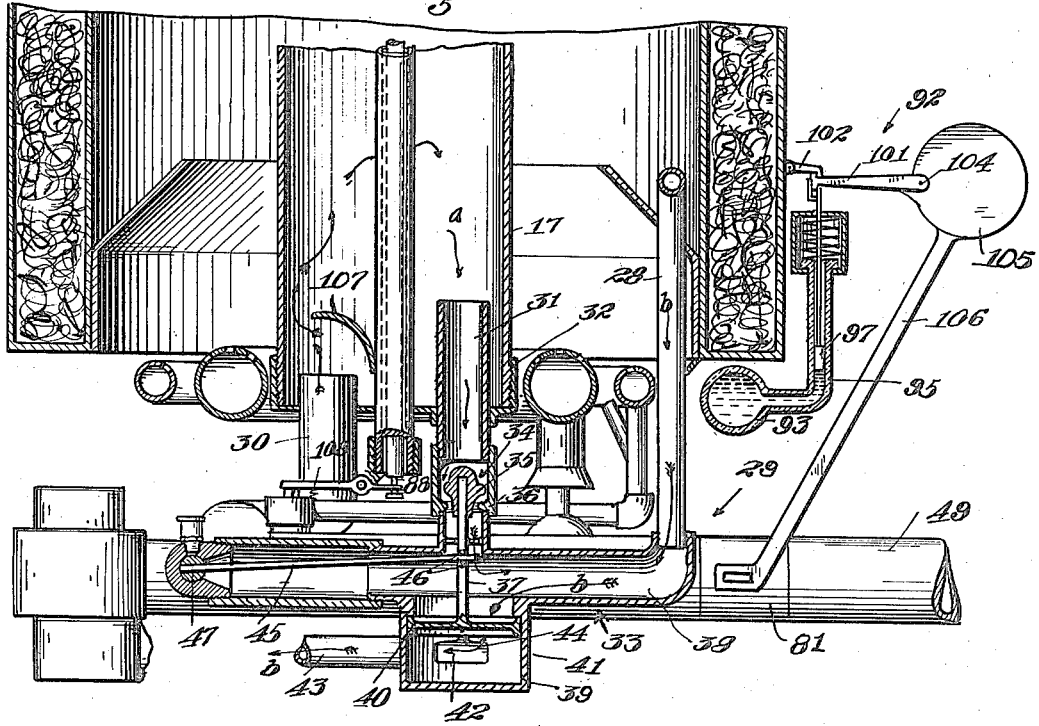
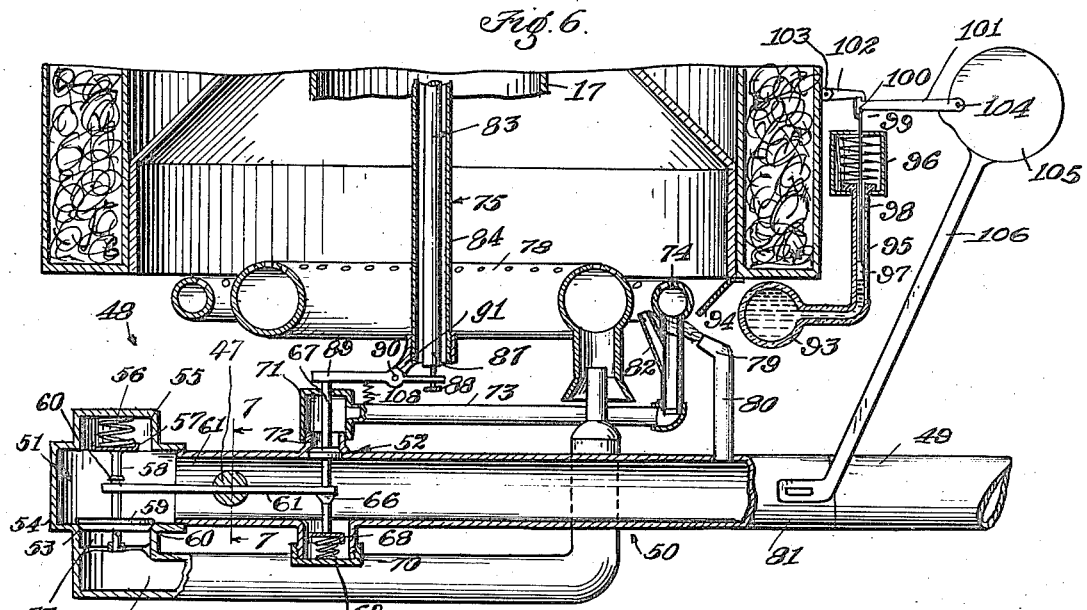
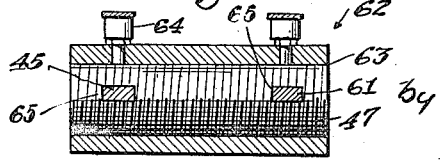
Inventor,
Hugh G. Shaug.
Hazard Berry Miller
Atty's.

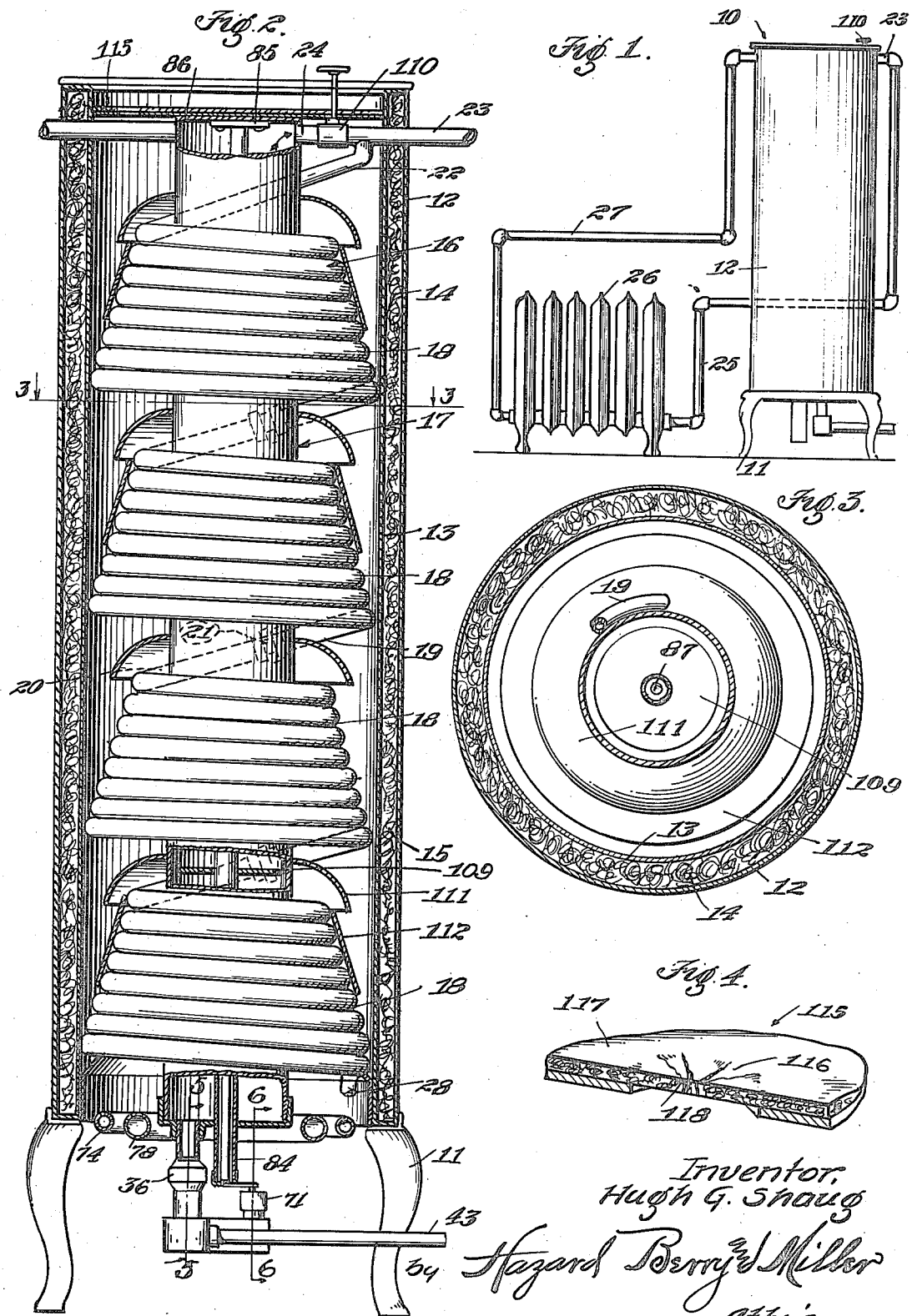

UNITED STATES PATENT OFFICE.

HUGH G. SHAUG, OF LOS ANGELES, CALIFORNIA.

WATER-HEATER.

1,255,835.     Specification of Letters Patent.    Patented Feb. 5, 1918.

Application filed April 15, 1916. Serial No. 91,468.

*To all whom it may concern:*

Be it known that I, HUGH G. SHAUG, a citizen of the United States, residing at Los Angeles, in the county of Los Angeles and State of California, have invented new and useful Improvements in Water-Heaters, of which the following is a specification.

This invention relates to water heaters and particularly pertains to a water heater of the instantaneous type.

It is the object of this invention to provide a water heater embodying a water circulation system in which the flow of water induced by heat will traverse the system in one direction and when the flow is occasioned by drawing off a volume of water its direction of travel will be reversed thereby tending to eliminate corrosion in the system.

Another object is to provide an instantaneous water heater having differential supplementary heating burners in which initial heating may be effected by a yellow flame burner as in drawing off a small volume of water, and a more intense heat supplied by a blue flame or Bunsen burner when a large volume of water is drawn off, embodying an automatic burner control regulated by the volume of water discharged.

A further object is to provide a water heater which may be utilized both as an instantaneous heater, as in supplying hot water for domestic purposes, and at the same time employed to supply hot water to a heat radiating system.

Other features and objects of this invention are as follows:

To provide a thermostatic means for maintaining the water at a given temperature within the heater, said means being provided with adjustment so that optional temperatures may be maintained;

To provide said water heater with thermostatic means for cutting off the entire supply of gas being delivered to the heater in case the pilot light is extinguished;

To construct the heating chamber of said heater so that when a low temperature of heat is being maintained the burned gases within the heater will have difficulty in escaping therefrom and thus the maximum amount of heat will be absorbed by the water, said construction providing for the escape of the excessive volume of burned gases generated when the heater is operated at a high temperature;

To construct said water heater so that a maximum amount of heat will be absorbed by the water;

To provide a water heater constructed of self-contained units which may be readily assembled in various combinations to provide a heater for a given purpose;

To arrange the water reservoirs and conduits within the heater so that a complete flow of water will be effected in the reverse direction from that induced by heat, therethrough in such a manner as to thoroughly cleanse the heating coils;

To arrange the water containing chambers within said heater in such a manner that minimum condensation will take place when cold water passes therein;

To provide thermostatic control mechanism for insuring that the heat chamber is completely dry after a volume of water has been drawn from the heater and the supply is no longer demanded;

To provide a heater which will supply warm water immediately after the volume of cold water, which lies in the pipe line interposed between the faucet and the heater, has been drawn off thereby insuring an immediate warming of the pipe line through which the heated water is to flow;

To arrange the circulatory system of the water within the heater so that its flow will be concentrated at points provided with the maximum amount of heat being generated by the heater burners;

To provide a thermostatic control for the regulation of the fuel supply to said heater which will not be acted upon by fluctuating water pressures due to line openings and closings at remote or adjacent points along the draw-off pipes.

Other objects will appear hereinafter.

The invention is illustrated in the accompanying drawings in which:

Figure 1 is a side elevation of the water heater showing it in operative connection with gas and water conduits for providing water for domestic purposes and also as being connected with a heat radiating system to which hot water may be supplied from said heater.

Fig. 2 is a vertical section of the heater and taken through the same vertical plane as shown in Fig. 1.

Fig. 3 is a horizontal section along the line 3—3 of Fig. 2.

Fig. 4 is a perspective view of a portion of the baffle plate used in the top of the heater.

Fig. 5 is a vertical cross section taken through the water control mechanism as indicated along the line 5—5 of Fig. 2.

Fig. 6 is a vertical section through the fuel supply and control mechanism along the line 6—6 of Fig. 2.

Fig. 7 is a vertical section taken on the line 7—7 of Fig. 6.

Referring to the drawings, the numeral 10 indicates a water heater here shown as cylindrical and vertically supported on legs 11, and having an outer cylindrical shell 12 encircling and spaced from an inner cylindrical shell 13 of lesser diameter, forming an annular chamber 14 between the walls 12 and 13, which is filled with heat insulating material 15. This shell contains heating coils 16 and a water tank 17. The water tank 17 is here shown as of a diameter considerably less than the inside diameter of shell 13 and extends vertically therethrough. Encircling the water tank 17 is the series of coils 16 formed in super-posed frusto-conical units 18, the sections of the coils 18 being connected together at their terminating ends 19 and 20 by pipe unions 21. The terminating end 22 of the uppermost coil is connected to a conduit 23 which is T-shaped and has one of its ends 24 in communication with the tank 17 and its other end leading through a pipe 25 to one end of a heat radiator 26 as shown in Fig. 1. The opposite side of said radiator communicates through a conduit 27 to the upper portion of the tank 17 and is connected therewith at a point approximately diametrically opposite to the pipe 24. The end portion 28 of the lowermost coil connects with a water control system 29, to which the lower end of the tank 17 is also connected, thus connecting the tank and coil together at both ends.

The water control system 29 is particularly illustrated in Fig. 5 which shows the tank 17 as being supplied with water through a main 30. Mounted in communication with the tank 17 and diametrically opposite the supply main 30 is an outlet pipe 31 which is suitably secured within the lower head 32 of the tank 17. Mounted upon and in communication with the lower end of pipe 31 is an automatic valve or flow motor mechanism 33 by which the flow of water and its circulation is controlled within the heater. Said mechanism consists of a water flow reversing valve 34 secured adjacent the end of pipe 31 and comprising a movable valve head 35 adapted to seat on an annular shoulder 36 and designed to be reciprocally actuated by a valve rod 37 which extends downwardly across a coil communicating conduit 38 and into a watertight dash-pot 39 depending below said conduit 38. The rod 37 has formed upon its lower end and within said dash-pot a piston 40 adapted to normally rest against the upper wall or head of the member 39. Formed upon one side and through the cylindrical wall 41 of said dash-pot is an opening 42 which communicates with a draw-off pipe 43. The outlet opening 42 is of a peculiar configuration, it being substantially rectangular in shape and having a small lead channel formed midway of its upper edge, as indicated at 44. The object of this construction will be hereafter described.

The reciprocal movement of the valve rod 37 is utilized to move a gas control operating lever 45. Said lever is forked at its one end and adapted to accommodate the rod 37 between the arms of said fork. A pair of pins 46 secured at either side of the forked portion of said lever and within the rod 37 positively actuate the lever arm 45. The arm 45 is mounted at its other end within a rotatable valve controlling shaft 47, one end of which shaft terminates within the water conduit 38 and the other end of which terminates within a control mechanism 48 by which the flow of gas is regulated.

Fig. 6 illustrates in detail the construction of the gas control with which the shaft 47 is operatively connected. The gas control mechanism 48 is supplied with gaseous fuel by means of a supply pipe 49 which is here shown as lying in a horizontal plane with the body portion 50 of the mechanism 48. The body member 50 has formed at the opposite end from that with which the supply pipe connects, a pair of valves 51 and 52. The valve 51 has an annular shoulder 53 formed within the lower wall of an extension member 54 of the body portion 50. A recess 55 is formed upon the diametrically opposite side of the member 54 and has mounted therein a helical spring 56 which bears downwardly upon a disk 57 formed integral with the upper end of a valve stem 58 which is adapted to raise and lower the valve head 59 relative to the shoulder 53. A shoulder 60 is formed upon the valve stem 58 approximately mid-way between the member 59 and the disk 57, for engagement with the upper face of a valve raising arm 61.

The valve raising arm 61 is connected to the valve controlling shaft 47 and is operated by means of the flow motor mechanism 33 by means of the lever arm 45. The shaft 47 which is interposed between and rigidly secured to the lever arms 45 and 61 has its ends terminating within the water and gas passages and it is therefore necessary to provide some effective means for preventing the escape of gas through the shaft bearing or the leakage of water therethrough. This is effected by means of the specially constructed bearing 62, as illustrated in Fig. 7, where the bearing is shown as extending horizontally and being threaded throughout its bore 63, said threads being in engagement with complementary threads upon the shaft 47. Grease cups 64 are mounted upon this bearing and in communication with threaded bore 63 and provide a lubricant under pressure to the surface of the shaft.

The valve raising arm 61 extends through an opening 65 within the shaft 47 and has an extension adapted to engage a shoulder 66 formed upon a stem 67 of the valve 52. A disk 68 mounted upon the lower end of the valve stem 67 affords a bearing for an expansion spring 69 which is seated within a recess 70 formed in the lower wall of the body member 50. This spring tends to force the piston rod 67 upwardly and in conjunction with the spring 56 tending to force the stem 58 downwardly, serves to overbalance the piston 40 and return it to its normal upper position thereby unseating the valve 35.

The gas control mechanism is connected to the burners in the following manner: A mounting 71 is placed over the passage 72 leading from the valve 52 and is adapted to communicate with a supply pipe 73 leading to a primary annular gas burner 74. An extension of the rod 67 projects through the end wall of the mounting 71 and into engagement with a thermostatic control mechanism 75. A conduit 76 leads from the communicating passage 77 formed beneath the valve 51, said passage adapted to supply gas to a secondary Bunsen or blue flame gas burner 78 arranged concentric with the burner 74. It will thus be seen that the large Bunsen burner 78 and the burner 74, which is a white flame burner, are controlled from the flow motor 33 through the gas control mechanism by means of the valves 51 and 52 respectively. When the piston 40 goes down both burners are turned on.

It has been one of the most common faults and greatest objections to instantaneous heaters of common constructions that the flame sometimes becomes extinguished so that escaping gas fills the heat chamber. When water was drawn from the heater at such a time the pilot light within the heater was liable to produce a delayed ignition and cause an explosion. To eliminate the possibility of the heat chamber being filled with gas should it be extinguished, I provide an ignition system which is adapted to ignite a large pilot light in reach of both burners, as shown in Fig. 6, and which consists in a primary pilot burner 79 positioned at an angle to the vertical and fed by means of a small feed pipe 80 in connection with the gas mains 49. The point at which said connection is made is intermediate a supply cut-off valve 81 and the gas control mechanism 48. It will thus be seen that under a normal condition this pilot light will at all times be burning. When water is drawn from the circulatory system of the heater, gas will be supplied to the white gas burner 74 by means of its supply pipe 73. This pipe has formed within one of its sides and adjacent the burner 74 a secondary ignition pilot 82 fitted with a tip which throws a saucer-shaped flame therefrom. This burner terminates at a point between the two heater burners 74 and 78 and is ignited by the primary pilot 79. The flame from the pilot 82 extends over the escaping gas from both burners 74 and 78 and will ignite them upon gas being supplied to either of them.

As a means for maintaining a certain low heat within the body of the heater so that at the instant the water is drawn from the length of the pipe-lines intervening between the faucet and heater a flow of warm water will pass into the pipe, a thermostat 83 is provided for controlling the gas supply to the heater burner 74 which will hereafter be designated as a white flame burner or the primary burner. The thermostat 83 is mounted within a vertically extending tube 84 which is secured by means of bolts or rivets 85 to the upper head 86 of the water tank 17. Similarly secured within the tube 84 and to the head 86 is a depending and downwardly extending thermostat member 87 which extends the length of tube 74 and through the opening in the lower end thereof. This thermostat member 87 is of a diameter less than the inside diameter of the tube 84 and is formed of some suitable metal or material which is sensitive to the action of heat and will contract and expand throughout its longitudinal length as the temperature of the surrounding water within the tank 17 raises and lowers. The expansion of said member 87 is adapted to act upon a screw 88 which abuts its lower end and is mounted within a valve operating lever 89 pivoted at 90 to a bracket 91. The lever 89 is disposed horizontally and has the screw 88 mounted within one of its arms and the other arm adapted to bear upon an extension of the valve stem 67 upon which the valve member 52 is mounted. In this manner the white flame or primary burner valve is thermostatically controlled to be turned on without the action of the flow motor.

In order to positively insure that gas will not be supplied to either of the heaters when the pilot light is extinguished, I have provided a gas cut-off thermostat 92 which operates to entirely cut off the supply of gas when the pilot light within burner 79 is extinguished. This thermostat comprises a glass bulb 93 which is located at a point adjacent the burner 79 and within the direct path of travel of the heat generated by said burner. An asbestos sheet 94 is mounted over the burner and at an angle to direct the heat in and upon the bulb 93. Said bulb is filled with mercury and has a conduit 95 leading from one of its sides within which the mercury has free passage. The conduit 95 is bent at right angles and extends upwardly, terminating within a spring housing 96. A small plunger 97 is placed within the vertically extending portion of the conduit 95 and directly over the volume of mercury. To insure against the leakage of the mercury around the plunger it is packed with hard oil and in this way prevents the escape of the mercury. A stem 98 extends upwardly from said plunger and through the housing 96, its upper end terminating in a fork 99 which engages one leg of a T-shaped member 100 formed at the end of a weight supporting pawl 101. The opposite or upper leg of said T-shaped portion is engaged by a horizontally disposed pawl 102 pivoted at 103 to the side wall or outer shell of the heater. The weight supporting pawl 101 is pivotally mounted at 104 to a weight 105 by which the valve 81 is cut off. The weight 105 is rigidly mounted in relation to the valve 81 by means of a valve operating arm 106 formed integral at its upper end with the weight and rigidly secured at its lower end to the stem of valve 81. By this thermostatic arrangement the cooling of the mercury within the bulb 93 acts to operate the various pawls to release the weight 105 and cause it to fall, thus turning the valve a quarter of a turn and positively insuring that gas will not be supplied to any burner within the heater.

*Operation.*

Under normal conditions the flow motor 33, the gas control mechanism 49, white flame burner control thermostat 83, and the gas cut-off control thermostat 92 will be in the positions shown in Figs. 5 and 6. The water supplied the heater will enter through the constant supply pipe 30 in the direction as indicated by the arrow —a—. Upon entering the tank it will encounter an arcuate baffle plate 107 which is placed in the path of travel of the incoming water and retards its flow. After entering the tank 17 it will return through pipe 31 past the valve member 35 and through conduit 38 into the coils until the tank and coils are filled. Its circulation when induced by heat is upward through the entire length of the coils and into the upper end of tank 17 through the pipe 24 and downward through the tank. In this way a normal circulation of water is maintained. Should the temperature of the water fall below a given point, which may be determined by the adjustment of screw 88 which abuts against the lower end of thermostat rod 87, the lever 89 will be forced down upon the end of valve rod 67 by means of a spring 108 and will thereby supply gas to the white flame or primary burner 74 through the valve 52. In this way it will be seen that a predetermined temperature may be maintained within the tank 17 by automatic means.

When the water is drawn off from the heater through the draw-off pipe 43, the piston 40 will descend and this action within the water and gas control mechanisms immediately causes the gas to be lighted within the white flame and blue flame or Bunsen burners successively. This is accomplished in the following manner:

The dash-pot 39 is filled with water at a given pressure, said pressure being the pressure of the supply line. When water is drawn through pipe 43 it relieves the pressure within the dash-pot 39 and allows the piston 40 to descend. As the piston 40 is lowered within the cylinder 41 the orifice 42 is gradually opened, that is the piston 40 passes below it and allows communication between said opening 42 and the water conduit 38. In this manner water will immediately pass from the heater into the pipe 43. Attention is directed at this point to the fact that simultaneous with the movement of the piston 40 the direction of the water flow circulation within the heater will be reversed. This is effected by means of the valve 34 which is superimposed upon the flow motor mechanism as shown in Fig. 5. It will be seen that under normal conditions the water will pass through the flow motor mechanism as heretofore indicated by the arrow —a— and that when the piston 40 falls within the dash-pot 39 the valve closing member 35 will drop. The valve closing member 35 when in its lowermost position seats upon a valve seat 36, thus making it impossible for water to pass downwardly through the outlet pipe 31. The circulation of water thereafter will be established in this manner. Water entering the heater tank 17 by pipe 30 will pass upwardly and will be obstructed at intervals along its upward travel by means of horizontally extending baffle plates 109 which are mounted upon the thermostat tube 84 and which are of a diameter slightly less than the inner diameter of the water tank 17. The flow of water is restricted by said baffle plates and causes the water to pass the baffle plate in a thin film and adjacent the wall of the tank. The flowing water passes at the upper end of the tank into pipe 24 through valve 110 and downwardly through conduit connection 22 into the spirally arranged heating coils 16 and to the flow motor 33, as indicated by the arrow —b— in Fig. 5. It will be noted that as before mentioned the heating coil is formed in units, each one being of a spiral configuration and having its smaller diameter uppermost. The small diameter of each coil unit occurs adjacent the point of location of the baffle plates 109 within the tank. This combined arrangement is used to concentrate the flame of the burners at a given point along the line of circulation of the water and is facilitated by means of a flame baffle 111 which is mounted between each of the coiled units and extends outwardly and downwardly in a manner to entrap the heat and throw it in upon the coil. Sheets of asbestos 112 are wrapped around the coil and tend to confine the heat within the coil convolutions. After the water has passed downwardly the length of the coil it passes into the dashpot and through the draw-off pipe 43 as in the former circulation system. The flow motor reverses the circulation.

When it is intended to use the water heater in connection with a heat radiating system the valve 110 is closed and the water passes upwardly, on flow being induced by heat, through the coils 16 out through the supply main 25 which connects with the radiating heat units, and its return pipe 27 connects with top of the tank 17 which causes the water to flow downwardly through the tank and upwardly through the heat coils. In this manner the heater may be optionally used for the heating of domestic water or a radiating system.

As before stated, the flow of water through the heater is adapted to operate and light the gas burners 74 and 78. This is accomplished in the following manner: When a small quantity of water is to be drawn from the heater the plunger 40 moves downwardly and its vertically extending stem which is in engagement with the gas control lever arm 45 causes it to rotate upon its center. This movement rotates the shaft 47 within the special bearing 62, the opposite end of said shaft having mounted to rotate with it the lever 61. As the gas control lever 45 moves downwardly, the lever 61 moves in a similar direction and its downwardly moving arm engages the shoulder 66 on stem 67 and operates to open the white flame burner valve 52. There is lost motion between the lever 61 and the shoulder 60 so that the primary burner may be started without starting the secondary burner. This valve allows the gas to be supplied to the white flame burner and the secondary pilot burner 82 which will be lighted and will in turn light the burner 74. An increased flow of the water through the draw-off pipe 43 will further rotate shaft 47 and operate lever 61 to lift the valve member 59 and allow gas to be fed to the blue flame burner. When the flow of water is discontinued the lever 45 will assume its normal position as shown in Fig. 5.

To insure that the gas supply will be entirely cut off when the pilot light 79 is extinguished the mercury within the bulb 93 will contract and allow the plunger 97 to fall within the tube 95. This draws the forked end 99 of the stem 98 downwardly and relieves the pawl 101 which allows the weight 105 to fall and cut off the gas supply within the valve 81.

During the circulation of heat within the heat chamber the false head 115 acts to retard the escape of the heat through the perforations 116 by means of the asbestos mat 117 formed with ragged perforations. When the heat is at a low degree the productions of combustion will be retarded by the flap portions, and when the heat is intense its force will open the perforation 117 and allow its escape therethrough. This arrangement acts to conserve the heat within the chamber.

It will thus be seen that I have embodied in a water heater a reversible circulatory system, a water controlled heat regulating system, a thermostatically controlled heat maintaining device, and safety means thermostatically controlled for cutting off the supply of gas.

I claim:

1. In a water heater, a heat generator including a primary and a secondary burner adapted to produce a variable degree of heat, a water circulating system disposed in the path of travel of said heat, means for maintaining the circulation of water in one direction when the heat is supplied by the primary burner, a valve for interrupting the circulation and a flow motor connected to the valve and to the secondary burner whereby the direction of flow of said water is reversed and the degree of heat is increased.

2. In a water heater, a heat generator including a primary and a secondary burner adapted to produce a variable degree of heat, a water circulatory system adapted to absorb said heat, means for maintaining a constant direction of circulation of the water under the influence of the primary burner within said circulatory system, a valve for interrupting the circulation, a flow motor connected to the valve whereby the direction of flow may be reversed, and means whereby the action of the flow of water in said reversed direction will turn on the secondary burner and effect an increase in the degree of heat maintained by the heat generator in a direct ratio to the volume of flow of said water.

3. In an instantaneous heater, the combination with a heat circulating system, of a pair of differential supplemental heating burners disposed therebeneath, means for producing a given degree of heat by one of said burners when water is not being drawn from the system, means for maintaining the flow of water in one direction during the operation of said burner, a valve for interrupting the circulation, and a flow motor connected to the valve whereby the withdrawal of water from the heater will reverse the direction of flow within the circulating system and connected to a valve to cause the secondary heat burner to ignite and supply an increased degree of heat to said system.

4. In a water heater, the combination with a heat generator having a primary and a secondary heating burner, of a water circulatory system disposed thereover, a heat radiating system connected with said water circulatory system, a water draw-off pipe connected with said circulatory system, means for normally maintaining a degree of heat and a continuous circulatiton of water throughout said radiating system from the primary burner, and a flow motor for turning on the secondary burner whereby a quantity of water may be superheated and drawn off through the draw-off pipe.

5. In a water heater, the combination with a water circulating system, of a supply pipe connected thereto, a draw-off pipe leading therefrom, a white flame gas burner disposed therebeneath, a blue flame gas burner arranged concentric with said white flame burner, thermostatic means for optionally maintaining a given temperature by the white flame burner, a valve for interrupting the circulation and a flow motor connected to the valve, and connected to the blue flame burner whereby the withdrawal of water through the draw-off pipe will reverse the flow and effect the ignition of the blue flame burner.

6. In a water heater, a water circulating system, a heat retaining wall surrounding said circulating system, a burner of small heat capacity disposed beneath said system, thermostatic control means operatively mounted within the system for maintaining a given degree of heat within the system, a water inlet pipe connected with said system, a water outlet pipe in connection with the system, a water flow operated valve mounted upon said outlet pipe and in connection with the draw-off pipe, means controlled by the pressure of the water within the draw-off pipe whereby said flow valve is operated, means connecting with said control means whereby a pair of gas regulating valves are operated, conducting means leading from one of said valves to the small capacity burner, a large capacity burner mounted within and concentric with said first-named burner, and in connection with the other gas regulating valve, a gas supply pipe connected with said gas regulating valves, means for igniting the burners from the supply pipe, and thermostatic means regulated by said ignition means whereby the supply of gas will be discontinued when the ignition means is inoperative.

7. In a water heater, a heater housing, a heat circulating system comprising a vertically disposed water tank and a series of heat coils encircling said tank, a heat generator disposed beneath said circulating system and including a primary and a secondary burner, a thermostatic control member mounted within said water tank and operatively connected with said heat generator for controlling the primary burner whereby a given temperature may be maintained within said circulating system, a valve for breaking the circulation and a flow motor connected to the valve, and controlled by the withdrawal of water from said system and connected to the secondary burner whereby the temperature within said heater may be materially increased over that normally maintained and determined by said thermostatic control.

8. In a water heater, the combination with a water circulating system, of a heat generating system, valve means for controlling the supply of fuel delivered to said heat generator, water controlled means for actuating said fuel control valves, a valve shaft connecting said fuel and water control means and means for preventing the escape of gas or the leakage of water between the water control member and the gas control member, along the valve connecting medium, said means consisting of a screw-threaded bearing, screw threads upon the valve shaft fitting in the bearing, and grease cups connected to the bearing for supplying hard grease to the screw threads.

9. In a water heater, a tank, a coil arranged around the tank, a connection between the top of the coil and the top of the tank, a connection between the bottom of the coil and the bottom of the tank, a valve in the lower connection, a primary burner in position to heat the coil, a secondary burner concentric with the primary burner, thermostatic means operatively connected for regulating the primary burner, a valve for regulating the secondary burner, a draw-off pipe leading from the bottom of the coil, and a flow motor in the draw-off pipe and connected to the valve in the connection between the lower end of the coil and the lower end of the tank and connected to the secondary burner; so that when water is passing through the draw-off pipe the connection between the lower end of the coil and the lower end of the tank is closed and the secondary burner is turned on.

In testimony whereof I have signed my name to this specification.

HUGH G. SHAUG.